United States Patent [19]

Kageyama et al.

[11] Patent Number: 5,183,127
[45] Date of Patent: Feb. 2, 1993

[54] SUSPENSION-TRACTION TOTAL CONTROL SYSTEM

[75] Inventors: Fumio Kageyama; Hirotaka Kanazawa; Shin Takahara; Toshiki Morita, all of Hiroshima, Japan

[73] Assignee: Mazda Motor Corporation, Hiroshima, Japan

[21] Appl. No.: 799,895

[22] Filed: Dec. 2, 1991

Related U.S. Application Data

[63] Continuation of Ser. No. 581,572, Sep. 12, 1990, abandoned.

[30] Foreign Application Priority Data

Sep. 13, 1989 [JP] Japan .................................. 1-238181
Mar. 23, 1990 [JP] Japan .................................. 2-74516

[51] Int. Cl.⁵ ........................ B60K 28/16; B60G 21/00
[52] U.S. Cl. .................................. 180/197; 280/707; 280/703; 364/424.05
[58] Field of Search ................ 280/707, 703; 180/197; 364/424.05; 303/109, 113 TR

[56] References Cited

U.S. PATENT DOCUMENTS

| | | | |
|---|---|---|---|
| 4,805,101 | 2/1989 | Dietrich et al. | 280/707 X |
| 4,805,102 | 2/1989 | Ise et al. | 280/707 X |
| 4,831,532 | 5/1989 | Kondo | 280/707 X |
| 4,872,701 | 10/1989 | Akatsu et al. | 280/707 X |
| 4,903,983 | 2/1990 | Fukushima et al. | 280/707 |
| 4,921,060 | 5/1990 | Imaseki et al. | 280/707 X |
| 4,953,890 | 9/1990 | Kamimura | 280/707 |
| 4,989,148 | 1/1991 | Gürke et al. | 280/707 X |
| 5,044,660 | 9/1991 | Yamamura et al. | 280/707 |
| 5,069,302 | 12/1991 | Kageyama | 280/707 X |

*Primary Examiner*—Margaret A. Focarino
*Assistant Examiner*—Kevin Hurley
*Attorney, Agent, or Firm*—Sixbey, Friedman, Leedom & Ferguson

[57] ABSTRACT

A vehicle is provided with both a traction control system which reduces driving torque for driving wheels of the vehicle when the driving wheels slip, and an active suspension system which has a cylinder disposed between the vehicle body and each of the wheels of the vehicle and in which suspension properties can be changed by controlling feed and discharge of the hydraulic fluid to and from the cylinders. A control gain of the active suspension system is increased when the traction control system is operating.

8 Claims, 13 Drawing Sheets

F I G. 3B
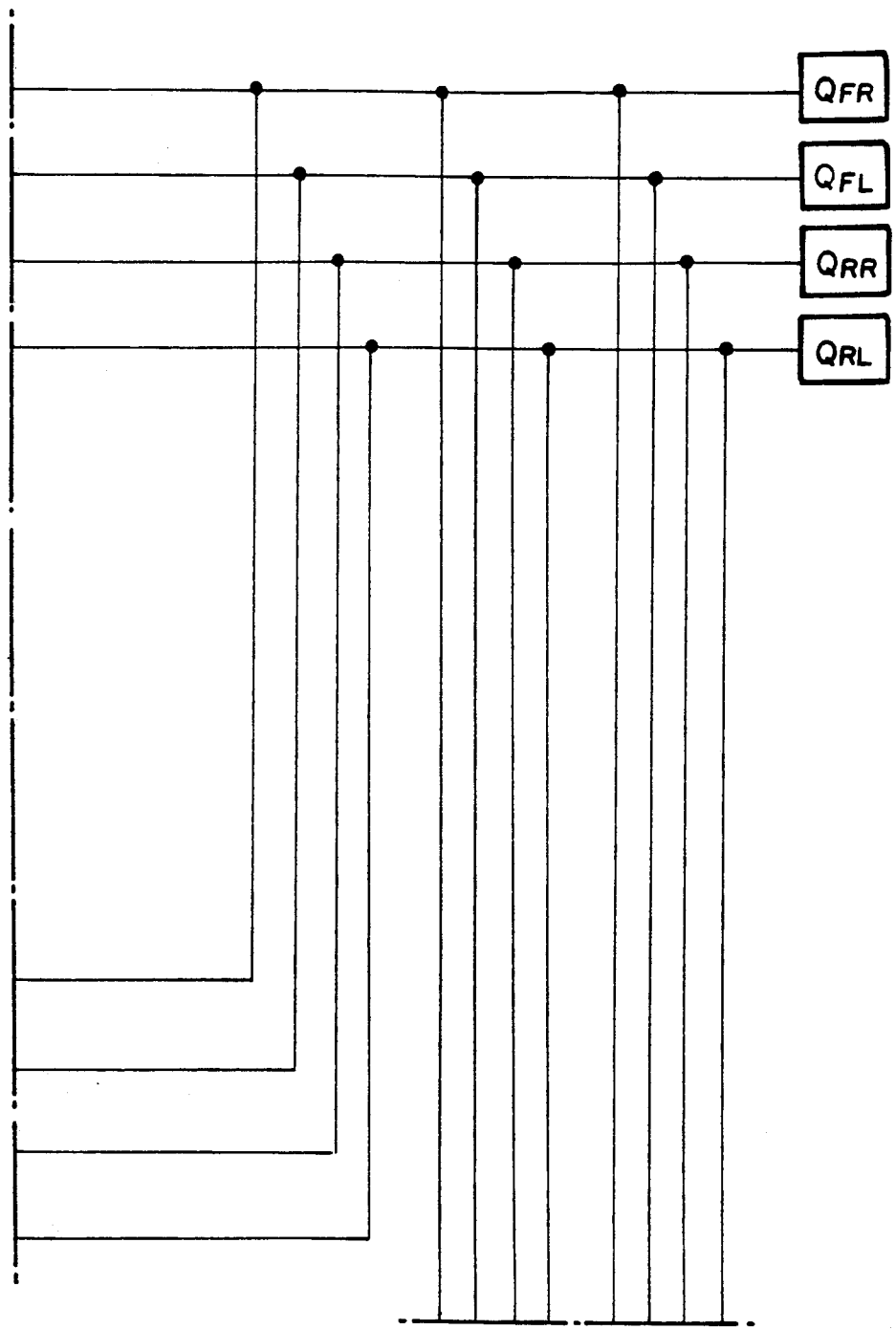

SUSPENSION-TRACTION TOTAL CONTROL SYSTEM

This application is a continuation of Ser. No. 07/581,572, filed Sept. 12, 1990, now abandoned.

BACKGROUND OF THE INVENTION

1. Field of the Invention

This invention relates to a suspension-traction total control system for a vehicle.

2. Description of the Prior Art

As disclosed, for instance, in U.S. Pat. No. 4,830,397, there has been known an active suspension system (ACS system) which comprises cylinder devices provided between the vehicle body and the respective wheels and in which hydraulic fluid is fed to or discharged from each of the cylinder devices separately from the other cylinder devices, whereby the suspension properties are changed so that the vehicle body is kept horizontal, and driving comfort and running stability are improved. Further, in U.S. Pat. No. 4,805,102, it is disclosed that the suspension properties are turned hard when slip of the driving wheels reaches a predetermined value during acceleration of the vehicle, thereby quickly suppressing inclination of the vehicle body caused by the acceleration slip control.

When the driving torque transmitted to the driving wheels is excessively large relative to the frictional resistance of road surface, the driving wheels will race and the driving force is lost, whereby the traction lowers. There has been known a traction control system (TRC system) which lowers the engine output power and brakes the driving wheels when the driving wheels slip, thereby controlling the driving torque to an optimal value and ensuring traction. (See, for instance, Japanese Unexamined Patent Publication No. 57(1982)-22948)

In the case of a vehicle provided with both the ACS system and the TRC system, generally the suspension control and the traction control are effected separately from each other.

However, since the part of the vehicle body on the driving wheels moves up and down in response to abrupt change of the driving torque during the traction control, it is preferred that the suspension properties be changed taking into account this fact.

SUMMARY OF THE INVENTION

In view of the foregoing observations and description, the primary object of the present invention is to provide a suspension-traction total control system which controls the traction and the suspension properties in connection with each other, thereby effectively suppressing change of attitude of the vehicle body during the traction control.

In accordance with the present invention, there is provided a suspension-traction total control system for a vehicle comprising a traction control system which reduces driving torque for driving wheels of the vehicle when the driving wheels slip, an active suspension system which has a cylinder disposed between the vehicle body and each of the wheels of the vehicle and in which suspension properties can be changed by controlling feed and discharge of the hydraulic fluid to and from the cylinders, and a control gain changing means which increases a control gain of the active suspension system when the traction control system is operating.

In the control system in accordance with the present invention, the control gain of the active suspension system is increased when the traction control system is operating, and accordingly, the suspension properties are quickly changed and change of attitude of the vehicle body during the traction control can be effectively suppressed.

BRIEF DESCRIPTION OF THE DRAWINGS

FIGS. 3, and 3A-3D show the operation of the controller for controlling the suspension properties.

DESCRIPTION OF THE PREFERRED EMBODIMENT

Figure 1:
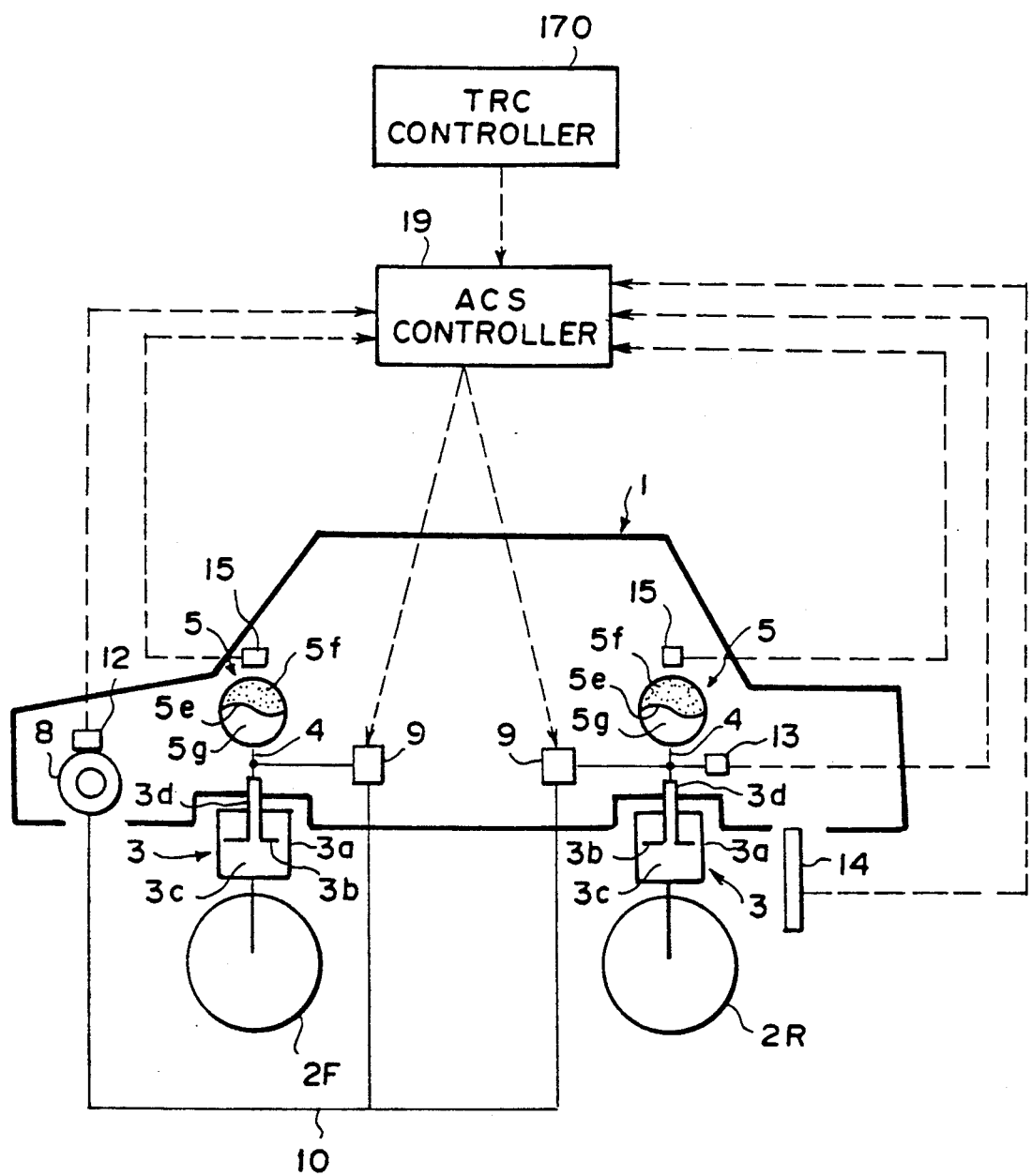
FIG. 1 is a schematic view showing an active suspension system.

In FIG. 1, reference numerals 1, 2F and 2R respectively denote a vehicle body, a front wheel and a rear wheel. A fluid cylinder 3 is connected between each wheel and the vehicle body 1. The fluid cylinder 3 comprises a cylinder body 3a and a piston 3b which is received in the cylinder body 3a and forms a liquid pressure chamber 3c in the cylinder body 3a. The piston 3b is connected to a piston rod 3d the upper end of which is connected to the vehicle body 1. The cylinder body 3a is connected to the wheel at the lower end thereof.

A gas spring 5 is connected to the liquid pressure chamber 3c of each fluid cylinder 3 by way of a communicating passage 4. The inner space of each gas spring 5 is divided into a gas chamber 5f and a liquid pressure chamber 5g by a diaphragm 5e, and the liquid pressure chamber 5g is communicated with the liquid pressure chamber 3c of the fluid cylinder 3.

Each fluid cylinder 3 is connected to a hydraulic pump 8 by way of a liquid pressure passage 10. A proportional flow control valve 9 which is provided in the liquid pressure passage 10 for each fluid cylinder 3 controls feed and discharge of hydraulic fluid to and from the liquid pressure chamber 3c of the fluid cylinder 3.

A discharge pressure sensor 12 detects the discharge pressure of the hydraulic pump 8, liquid pressure sensors 13 detect the liquid pressure in the liquid pressure chambers 3c of the respective fluid cylinders 3, and vehicle level sensors 14 detect the vehicle levels at the respective wheels (cylinder stroke). Further three vertical acceleration sensors 15 which detect the vertical acceleration of the vehicle body (vertical acceleration of the vehicle body on the wheels) are provided substantially on the same horizontal plane, two above the respective front wheels 2F and the other at the center between the rear wheels 2R. The detecting signals of these sensors are input into an ACS controller 19 which may be of a CPU, for instance, and the controller 19 changes the suspension properties on the basis of the detecting signals.

Figure 2:
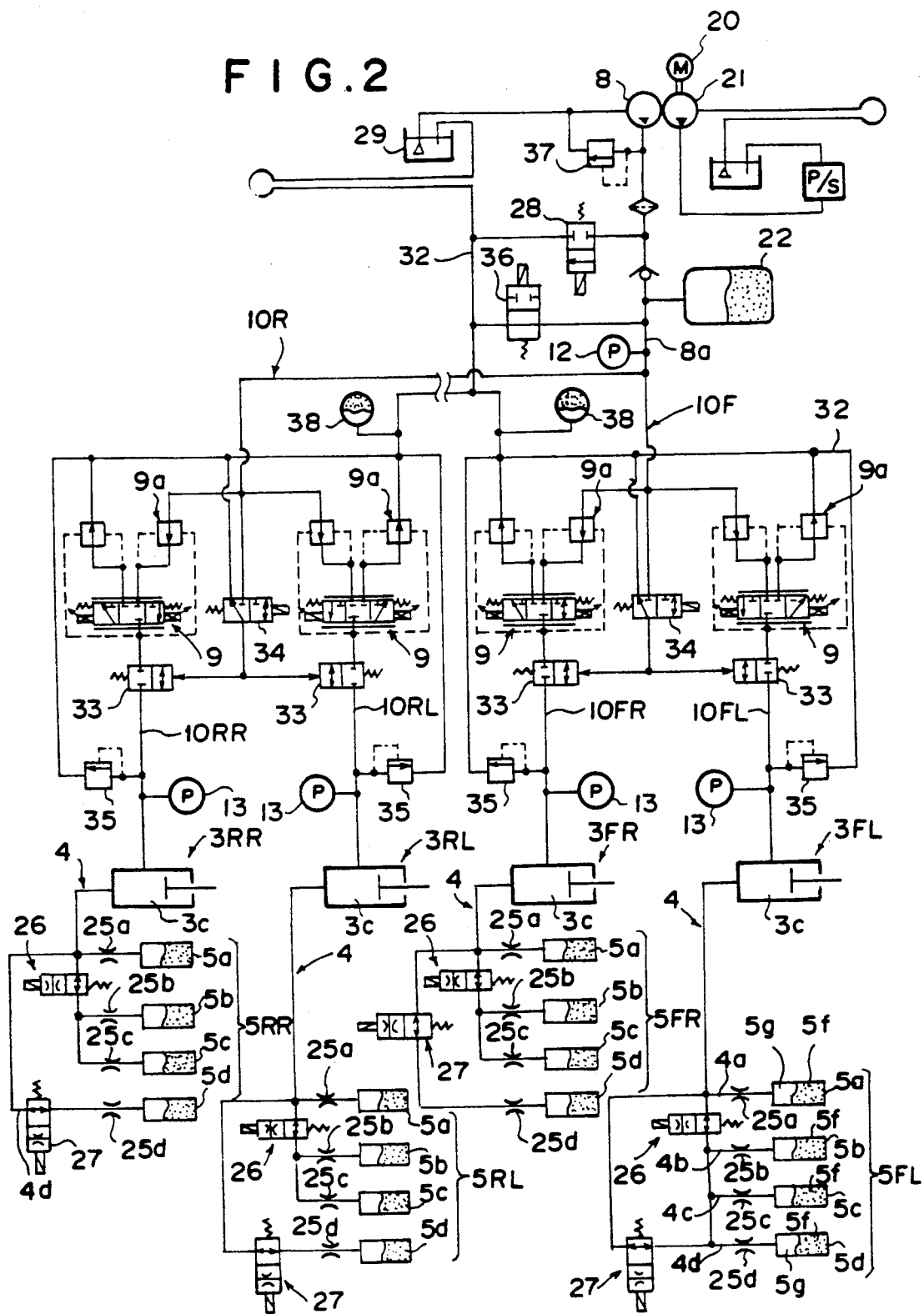
FIG. 2 shows the hydraulic circuit for the active suspension system.

The hydraulic pressure circuit which controls feed and discharge of the hydraulic fluid to and from the liquid pressure chambers 3c of the fluid cylinders 3 is shown in FIG. 2. In FIG. 2, the hydraulic pump 8 is connected to a hydraulic pump 21 for a power steering system so that they form a two-throw pump. The hydraulic pump 21 is driven by a motor 20. The discharge line 8a of the hydraulic pump 8 is provided with an accumulator 22. A front wheel side passage 10F and a rear wheel side passage 10R are connected to the discharge line 8a in parallel downstream of the accumulator 22. The front wheel side passage 10F branches into left and right front wheel side passages 10FL and 10FR which are respectively communicated with the liquid pressure chambers 3c of the fluid cylinders 3FL and 3FR for the left and right front wheels. The rear wheel side passage 10R branches into left and right rear wheel side passages 10RL and 10RR which are respectively communicated with the liquid pressure chambers 3c of the fluid cylinders 3RL and 3RR for the left and right rear wheels.

Gas spring groups 5FL, 5FR, 5RL and 5RR each consisting of four gas springs 5a to 5d are respectively communicated with the liquid pressure chambers 3c of the corresponding fluid cylinders 3 by way of communicating passages 4. The gas springs 5a to 5d are connected to the communicating passage 4 in parallel by way of branch communicating passages 4a to 4d respectively having orifices 25a to 25d. The orifices 25a to 25d exhibit attenuating effect and the gas in the gas chambers 5f of the gas springs 5a to 5d exhibit damping effect.

An attenuation changing valve 26 for changing the effective cross-sectional area of the communicating passage 4 is provided in the communicating passage 4 between the first and second gas springs 5a and 5b. The attenuation changing valve 26 moves between an open position where it wide opens the communicating passage 4 and a closed position where it substantially narrows the effective cross-sectional area of the communicating passage 4. When the vehicle turns, the attenuation changing valve 26 is moved to the closed position and restrains hydraulic fluid from flowing into and out the liquid pressure chambers 5g of the second and third gas springs 5b and 5c, thereby reducing the necessary amount of hydraulic fluid to be fed to or discharged from the liquid pressure chambers 3c of the fluid cylinders 3 and improving to control.

A switching valve 27 which is movable between an open position and a closed position is provided in the branch communicating passage 4d. When the switching valve 27 is in the open position, hydraulic fluid can flow into and out the liquid pressure chamber 5g of the fourth gas spring 5d and the suspension is soft. On the other hand, when the switching valve 27 is in the closed position, hydraulic fluid is restrained from flowing into and out the liquid pressure chamber 5g of the fourth gas spring 5d and the suspension is hard.

An unload relief valve 28 is connected to the discharge passage 8a of the hydraulic pump 8 near the accumulator 22. The relief valve 28 is movable between an open position and a closed position. When the discharge pressure of the pump 8 as detected by the discharge pressure sensor 12 exceeds an upper limit, the relief valve 28 is opened to return hydraulic fluid from the pump 8 to a reservoir 29, thereby fixing the pressure of hydraulic fluid in the accumulator 22 to a preset value. To each of the fluid cylinders 3 is fed the hydraulic fluid accumulated in the accumulator 22.

Since the arrangements for the left front wheel, the right front wheel, the left rear wheel and the right rear wheel are the same, only the arrangement for the left front wheel will be described here. The left front wheel side passage 10FL is provided with said proportional flow control valve 9. The proportional flow control valve 9 is movable among a cutoff position in which it closes all the ports thereof, a feed position in which it opens the left front wheel side passage 10FL, and a discharge position in which it communicates the fluid cylinder side portion of the left front wheel side passage 10FL with a return passage 32. Further the proportional flow control valve 9 has a built-in pressure compensating valve 9a which holds the hydraulic pressure in the fluid cylinder 3FL constant at a predetermined value when the flow control valve 9 is in the feed position or the discharge position.

On the fluid cylinder side of the proportional flow control valve 9, there is provided a pilot pressure responsive on-off valve 33 which opens and closes the left front wheel side passage 10FL. When a solenoid valve 34 opens, the hydraulic pressure in the left front wheel side passage 10FL on the hydraulic pump side of the proportional flow control valve 9 is applied to the on-off valve 33 as the pilot pressure. When the pilot pressure is not lower than a predetermined value, the on-off valve 33 opens the left front wheel side passage 10FL to permit the proportional flow control valve 9 to control the flow rate to the fluid cylinder 3FL. On the other hand, when the on-off valve 33 closes, the left front wheel side passage 10FL is closed in the liquid-tight fashion and prevents hydraulic fluid from flowing out the liquid pressure chamber 3c of the fluid cylinder 3FL.

In FIG. 2, reference numeral 35 denotes a relief valve which opens and returns hydraulic fluid to the return passage 32 when the pressure in the liquid pressure chamber 3c of the fluid cylinder 3FL becomes abnormally high. Reference numeral 36 denotes a valve which is connected to the discharge passage 8a of the hydraulic pump 8 near the accumulator 22 and is interlocked with the ignition key. The valve 36 is opened after the ignition key is turned off and returns hydraulic fluid in the accumulator 22 to the reservoir 29. Reference numeral 37 denotes an in-pump relief valve which returns hydraulic fluid to the reservoir 29 when the discharge pressure of the hydraulic pump 8 becomes abnormally high. Reference numeral 38 denotes a return accumulator which is connected to the return passage 32 and accumulates the hydraulic pressure when hydraulic fluid is discharged from the fluid cylinder 3.

Figure 3A:
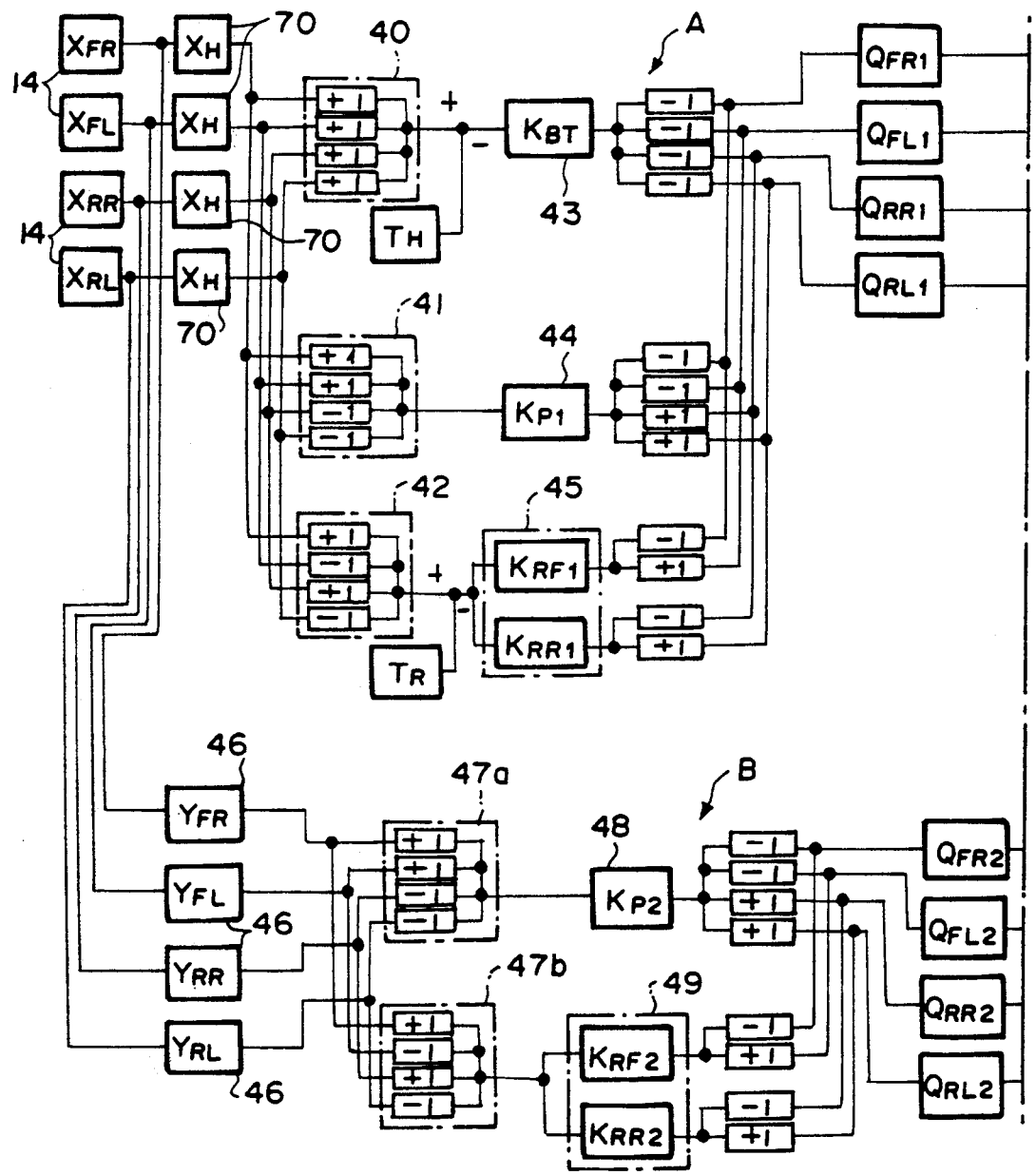
Figure 3C:
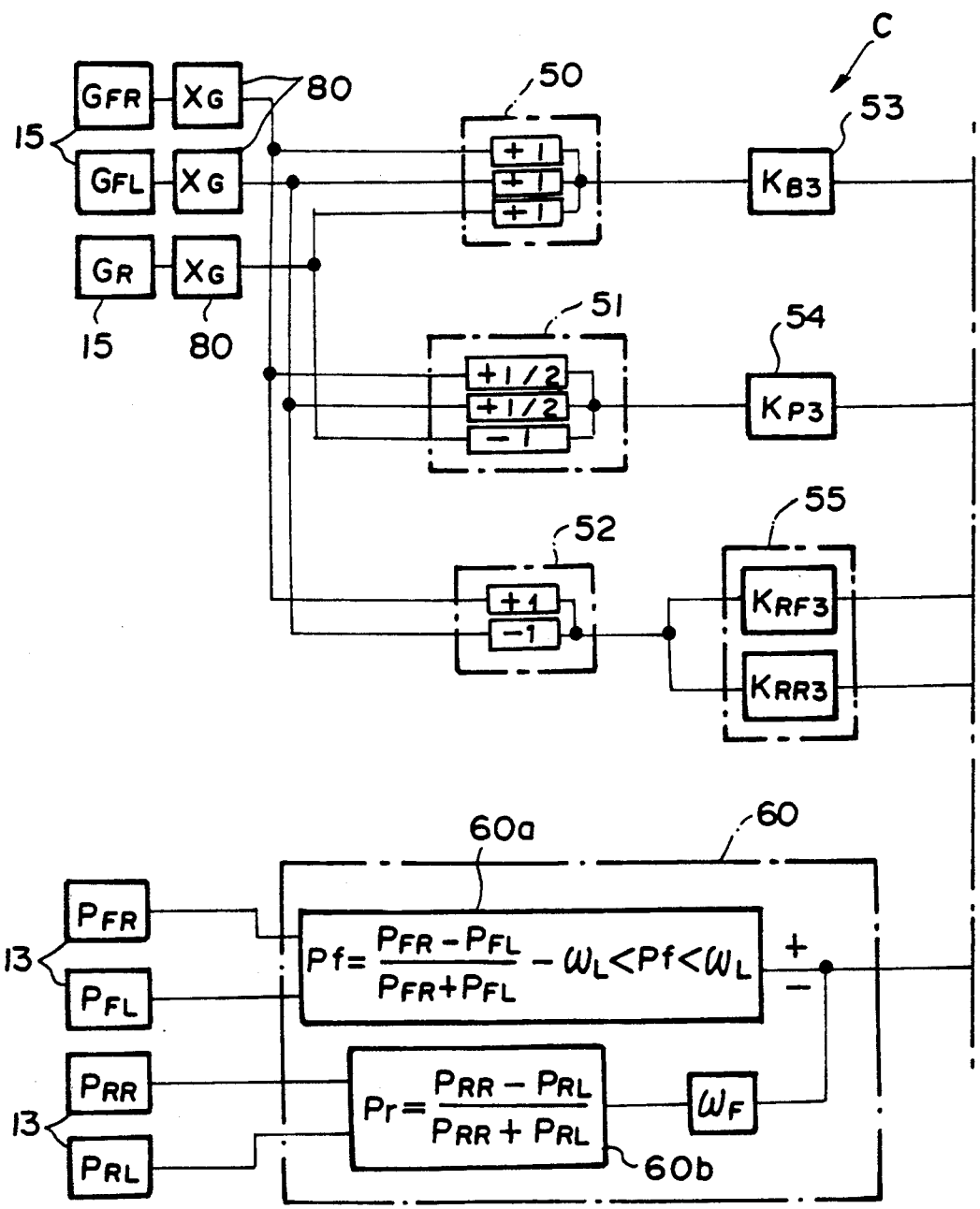
Figure 3D:
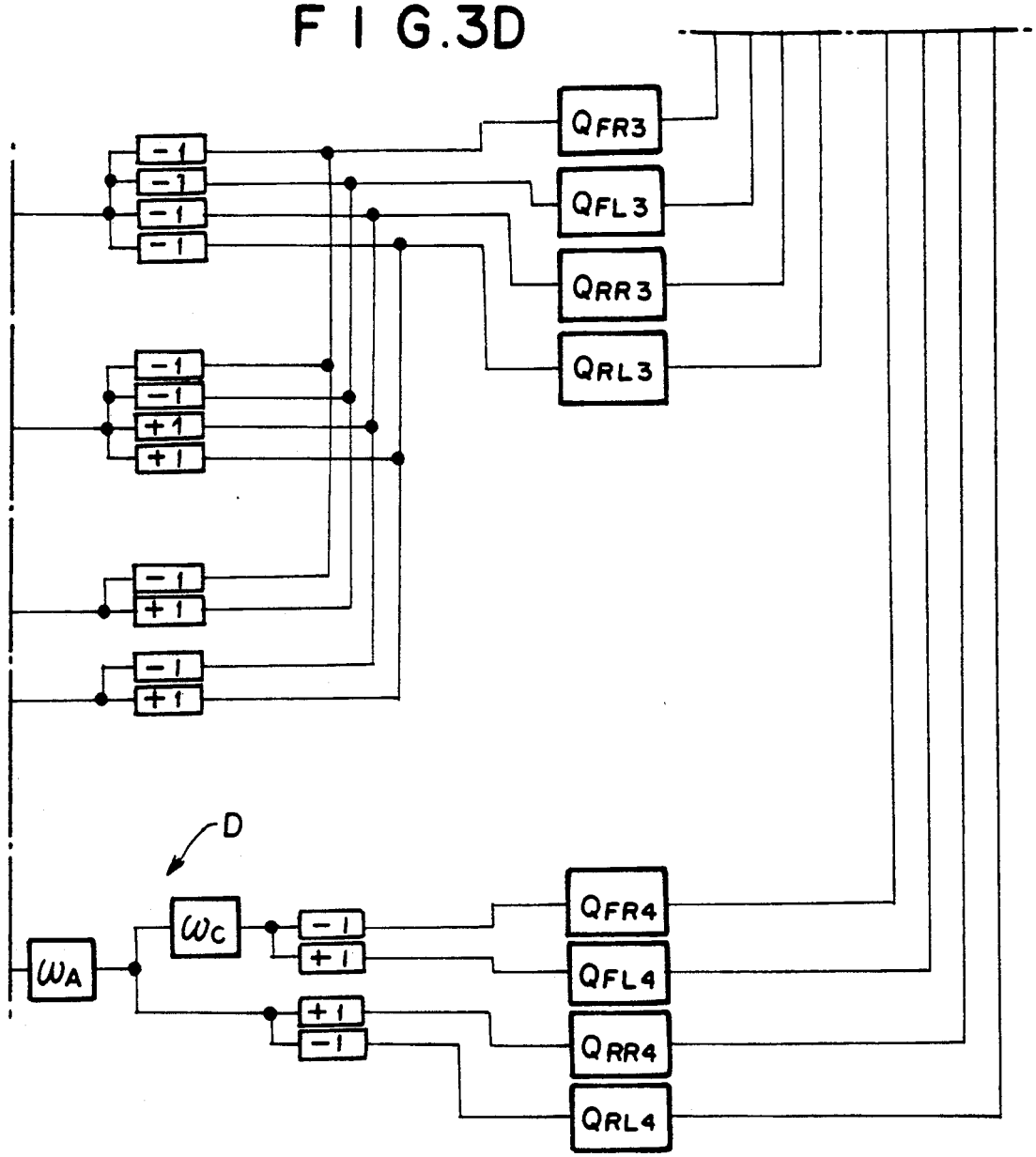
Figure 3:
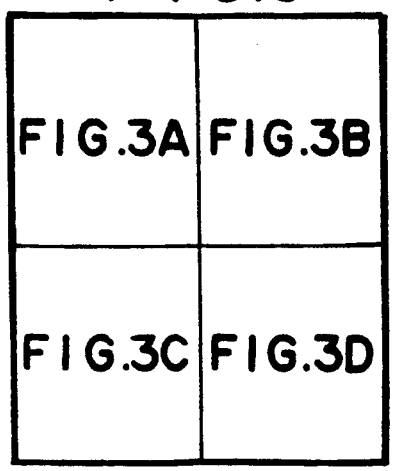

Now the operation of the controller 19 for controlling the suspension properties or controlling feed and discharge of hydraulic fluid to and from the liquid pressure chamber 3c of the fluid cylinder 3 will be described with reference to FIGS. 3A and 3B.

In FIGS. 3, and 3A-3D a control system A controls the vehicle level to a target level on the basis of the detecting signals (vehicle level displacement signals) XFR, XFL, XRR and XRL of the vehicle level sensors 14 for the respective wheels, a control system B suppresses the vehicle level displacement speed on the basis of vehicle level displacement speed signals YFR, YFL, YRR and YRL which are obtained by differentiating the vehicle level displacement signals XFR, XFL, XRR and XRL, a control system C suppresses vertical vibrations of the vehicle body on the basis of the detecting signals (vertical acceleration signals) GFR, GFL and GR of the three vertical acceleration sensors 15, and a control system D calculates warp of the vehicle body on the basis of the detecting signals (pressure signals) PFR, PFL, PRR and PRL of the liquid pressure sensors 13 and suppresses the warp of the vehicle body.

In the control system A, a bounce component calculating section 40 calculates the bounce component of the vehicle body by adding the vehicle level displacement signals XFR and XFL for the front wheels 2F, and adding the vehicle level displacement signals XRR and XRL for the rear wheels 2R. A pitch component calculating section 41 subtracts the sum of the vehicle level displacement signals XRR and XRL for the rear wheels 2R from the sum of the vehicle level displacement signals XFR and XFL for the front wheels 2F and calculates the pitch component of the vehicle body. A roll component calculating section 42 calculates the roll component of the vehicle body by adding the difference between the vehicle level displacement signals XFR and XFL for the front wheels 2F (XFR − XFL) and the difference between the vehicle level displacement signals XRR and XRL for the rear wheels 2R (XRR − XRL).

The bounce component of the vehicle body calculated by the bounce component calculating section 40 and a target average vehicle level TH are input into a bounce control section 43 which calculates, on the basis of gain KB1, the amount of hydraulic fluid to be fed to the liquid pressure chambers 3c of the respective fluid cylinders 3 for the bounce control. The pitch component of the vehicle body calculated by the pitch component calculating section 41 is input into a pitch control section 44 which calculates, on the basis of gain KP1, the amount of hydraulic fluid to be fed to the liquid pressure chambers 3c of the respective fluid cylinders 3 for the pitch control. The roll component of the vehicle body calculated by the roll component calculating section 42 and a target roll displacement TR are input into a roll control section 43 which calculates, on the basis of gains KRF1 and KRR1, the amount of hydraulic fluid to be fed to the liquid pressure chambers 3c of the respective fluid cylinders 3 for the roll control so that the vehicle level becomes a value corresponding to the target roll displacement TR.

The control variables calculated by the bounce control section 43, the pitch control section 44 and the roll control section 45 are inverted in their signs for each wheel, that is, the signs of the control variables are inverted for each wheel so that they become opposite to the sign of the vehicle level displacement signal (XFR, XFL, XRR or XRL) detected by the vehicle level sensor 14 for the wheel. Thereafter, the control variables for the bounce control, the pitch control and the roll control with the inverted signs are added together, and flow rate signals QFR1, QFL1, QRR1 and QRL1 for the flow control valves 9 for the respective wheels in the control system A are obtained.

Dead zone devices 70 are inserted between each vehicle speed sensor and the bounce component calculating section 40, the pitch component calculating section 41 and the roll component calculating section 42, and the vehicle level displacement signals XFR, XFL, XRR and XRL from the vehicle level sensors 14 are input into the bounce component calculating section 40, the pitch component calculating section 41 and the roll component calculating section 42 only when they exceed a preset dead zone XH.

The control system B has four differentiators which differentiate the vehicle level displacement signals XFR, XFL, XRR and XRL and calculates the vehicle level displacement speed signals YFR, YFL, YRR and YRL according to the following formula wherein Xn stands for the vehicle level displacement at time t, Xn−1 stands for the vehicle level displacement at time t−1, and T stands for the sampling time.

In the control system B, a pitch component calculating section 47a subtracts the sum of the vehicle level displacement speed signals YRR and YRL for the rear wheels 2R from the sum of the vehicle level displacement speed signals YFR and YFL for the front wheels 2F and calculates the pitch component of the vehicle body. A roll component calculating section 47b calculates the roll component of the vehicle body by adding the difference between the vehicle level displacement speed signals YFR and YFL for the front wheels 2F (YFR − YFL) and the difference between the vehicle level displacement speed signals YRR and YRL for the rear wheels 2R (YRR − YRL).

The pitch component of the vehicle body calculated by the pitch component calculating section 47a is input into a pitch control section 48 which calculates, on the basis of gain KP2, the flow control variable for controlling the flow rate of hydraulic fluid to each of the proportional flow control valves 9 for the pitch control. The roll component of the vehicle body calculated by the roll component calculating section 47b is input into a roll control section 49 which calculates, on the basis of gains KRF2 and KRR2, the flow rate of hydraulic fluid to each of the proportional flow control valves for the roll control.

The control variables calculated by the pitch control section 48 and the roll control section 49 are inverted in their signs for each wheel, that is, the signs of the control variables are inverted for each wheel so that they become opposite to the sign of the vehicle level displacement speed signal (YFR, YFL, YRR or YRL) calculated by the differentiator 46 for the wheel. Thereafter, the control variables for the pitch control and the roll control with the inverted signs are added together, and flow rate signals QFR2, QFL2, QRR2 and QRL2 for the flow control valves 9 for the respective wheels in the control system B are obtained.

In the control system C, a bounce component calculating section 50 adds up the outputs GFR, GFL and GR of the vertical acceleration sensors 15 and calculates the bounce component of the vehicle body. A pitch component calculating section 51 subtracts the output GR of the vertical acceleration sensor 15 which is disposed at the center between the rear wheels 2R from half of the sum of the outputs of the vertical acceleration sensors 15 above the front wheels 2F and calculates the pitch component of the vehicle body. A roll component calculating section 52 calculates the roll component of the vehicle body by subtracting the output GFL of the vertical acceleration sensor 15 above the left front wheel from the output GFR of the vertical acceleration sensor 15 above the right front wheel. The bounce component of the vehicle body calculated by the bounce component calculating section 50 is input into a bounce control section 53 which calculates, on the basis of gain KB3, the flow control variable for controlling the flow rate of hydraulic fluid to each of the proportional flow control valves 9 for the bounce control. The pitch component of the vehicle body calculated by the pitch component calculating section 51 is input into a pitch control section 54 which calculates, on the basis of gain KP3, the flow control variable for controlling the flow rate of hydraulic fluid to each of the proportional flow control valves 9 for the pitch control. The roll component of the vehicle body calculated by the roll component calculating section 52 is input into a roll control section 55 which calculates, on the basis of gains KRF3 and KRR3, the flow rate of hydraulic fluid to each of the proportional flow control valves 9 for the roll control.

The control variables calculated by the bounce control section 53, the pitch control section 54 and the roll control section 55 are inverted in their signs for each wheel, and the control variables for bounce control, the pitch control and the roll control with the inverted signs are added together, whereby flow rate signals QFR3, QFL3, QRR3 and QRL3 for the flow control valves 9 for the respective wheels in the control system C are obtained.

Dead zone devices 80 are inserted between each vertical acceleration sensor 15 and the bounce component calculating section 50, the pitch component calculating section 51 and the roll component calculating section 52, and the vertical acceleration signals GFR, GFL and GR from the vertical acceleration sensors 15 are input into the bounce component calculating section 50, the pitch component calculating section 51 and the roll component calculating section 52 only when they exceed a preset dead zone XG.

In the control system D, a warp control section 60 is provided with a front wheel side liquid pressure ratio calculating section 60a and a rear wheel side liquid pressure ratio calculating section 60b. The front wheel side liquid pressure ratio calculating section 60a receives liquid pressure detecting signals PFL and PFR from the liquid pressure sensors 13 for detecting the liquid pressures in the fluid cylinders 3 for the left and right front wheels 2F, and calculates the liquid pressure ratio Pf which is the ratio of the difference between the liquid pressures in the fluid cylinders 3 for the left and right front wheels (PFR−PFL) to the sum of the same (PFR+PFL), that is, Pf=(PFR−PFL)/(PFR+PFL). The front side liquid pressure ratio calculating section 60a outputs the liquid pressure ratio Pf as it is when −ωL<PfωL wherein ωL stands for a threshold liquid pressure ratio and outputs the threshold liquid pressure ratio −ωL when Pf<−ωL, and outputs the threshold liquid pressure ratio ωL when Pf>ωL. The rear wheel side liquid pressure ratio calculating section 60b receives liquid pressure detecting signals PRL and PRR from the liquid pressure sensors 13 for detecting the liquid pressures in the fluid cylinders 3 for the left and right rear wheels 2R, and calculates the liquid pressure ratio Pr which is the ratio of the difference between the liquid pressures in the fluid cylinders 3 for the left and right rear wheels (PRR−PRL) to the sum of the same (PRR+PRL), that is, Pr=(PRR−PRL)/(PRR+PRL).

The warp control section 60 multiplies the liquid pressure ratio Pr for the rear wheels by a predetermined value which is determined on the basis of gain ωF and subtracts the product from the liquid pressure ratio Pf for the front wheels. The output of the warp control section 60 is multiplied by a predetermined value which is determined on the basis of gain ωA. For the front wheels, the output of the warp control section 60 multiplied by the predetermined value is further multiplied by a predetermined value determined on the basis of gain ωC. The values thus obtained for the left wheels or right wheels are inverted in their signs so that the values for the left wheels and the right wheels are opposite to each other in sign, whereby flow rate signals QFR4, QFL4, QRR4 and QRL4 for the flow control valves 9 for the respective wheels in the control system D are obtained.

The flow rate signals for the flow control valves 9 in the control systems A to D obtained in the manner described above are added together for each wheel, thereby obtaining final flow rate signals QFR, QFL, QRR and QRL for the flow control valves 9.

The following table shows an example of a control gain map which is stored in the controller 19 and in which the control gains which are used in the control systems A to D are related to the operating conditions of the vehicle. In this particular embodiment, the operating conditions of the vehicle are divided into seven modes.

TABLE

| control gain | mode 1 | 2 | 3 | 4 | 5 | 6 | 7 | |
|---|---|---|---|---|---|---|---|---|
| KB1 | 0.02 | ← | ← | ← | ← | ← | ← | L/mm |
| KP1 | 0.02 | ← | ← | ← | ← | ← | ← | L/mm |
| KRF1 | 0.04 | ← | ← | ← | ← | ← | ← | L/mm |
| KRR1 | 0.04 | ← | ← | ← | ← | ← | ← | L/mm |
| KP2 | 0 | 0.05 | 0 | 0 | 0 | 0 | 0 | L/(mm/sec) |
| KRF2 | 0 | 0 | 0 | 0.03 | 0.05 | 0.07 | 0.03 | L/(mm/sec) |
| KRR2 | 0 | 0 | 0 | 0.03 | 0.05 | 0.07 | 0.03 | L/(mm/sec) |
| KB3 | 5 | 20 | 10 | 12 | 15 | 15 | 12 | L/G |
| KP3 | 5 | 20 | 10 | 12 | 15 | 15 | 12 | L/G |
| KRF3 | 5 | 15 | 15 | 20 | 30 | 40 | 20 | L/G |
| KRR3 | 5 | 15 | | 20 | 30 | 40 | 20 | L/G |
| ωA | 250 | ← | ← | ← | 350 | ← | 250 | — |
| ωF | 1 | ← | ← | ← | 1.2 | ← | 1 | — |
| ωL | 0.5 | ← | ← | ← | ← | ← | ← | — |
| ωC | 1 | ← | ← | ← | ← | ← | ← | — |
| XH | 5 | 1 | ← | ← | 5 | ← | 1 | mm |
| XG | 0.05 | 0 | ← | ← | ← | ← | ← | G |
| TH | 0 | ← | ← | ← | ← | ← | ← | mm |
| TR | 0 | ← | ← | ← | 5 | 3 | 10 | mm |
| QMAX | 5 | 18 | ← | ← | ← | ← | ← | L |
| PMAX | 110 | ← | ← | ← | ← | ← | ← | kgf/cm² |
| PMIN | 30 | ← | ← | ← | ← | ← | ← | kgf/cm² |

L stands for liters/min.

In the table, mode 1 shows the control gains to be used for 60 seconds after the engine stops. Mode 2 shows the control gains to be used when the vehicle speed is zero though the ignition is on. Mode 3 shows the control gains to be used when the vehicle travels straight with the lateral acceleration not larger than 0.1. Mode 4 shows the control gains to be used when the vehicle is making a gentle turn with the lateral acceleration larger than 0.1 and not larger than 0.3. Mode 5 shows the control gains to be used when the vehicle is making a moderate turn with the lateral acceleration larger than 0.3 and not larger than 0.5. Mode 6 shows the control gains to be used when the vehicle is making a sharp turn with the lateral acceleration larger than 0.5. Mode 7 shows the control gains to be used instead of those for mode 4 when the vehicle is making a gentle turn with the lateral acceleration larger than 0.1 and not larger than 0.3 while reverse roll mode has been selected by a roll mode selection switch (not shown). When the vehicle speed becomes not lower than 120Km/h, the mode is forcibly switched to mode 4 even if the reverse roll mode has been selected. In the table, QMAX stands for a maximum flow rate control variable to be fed to the proportional flow control valve 9 for each wheel, and PMAX stands for a maximum pressure in the liquid pressure chamber 3c of the fluid cylinder 3. The maximum pressure PMAX is set so that hydraulic fluid does not reverse from the liquid pressure chamber 3c to the accumulator 22. PMIN stands for a minimum pressure in the liquid pressure chamber 3c of the fluid cylinder 3. The minimum pressure PMIN is set so that the pressure in the liquid pressure chamber 3c is not excessively lowered and the gas springs 5 are not damaged. Further, in the table, each arrow indicates that values are the same as the value to which the arrow is directed. Except mode 7, the control gains are set so that the running stability of the vehicle body is improved as the mode number increases.

Figure 4:
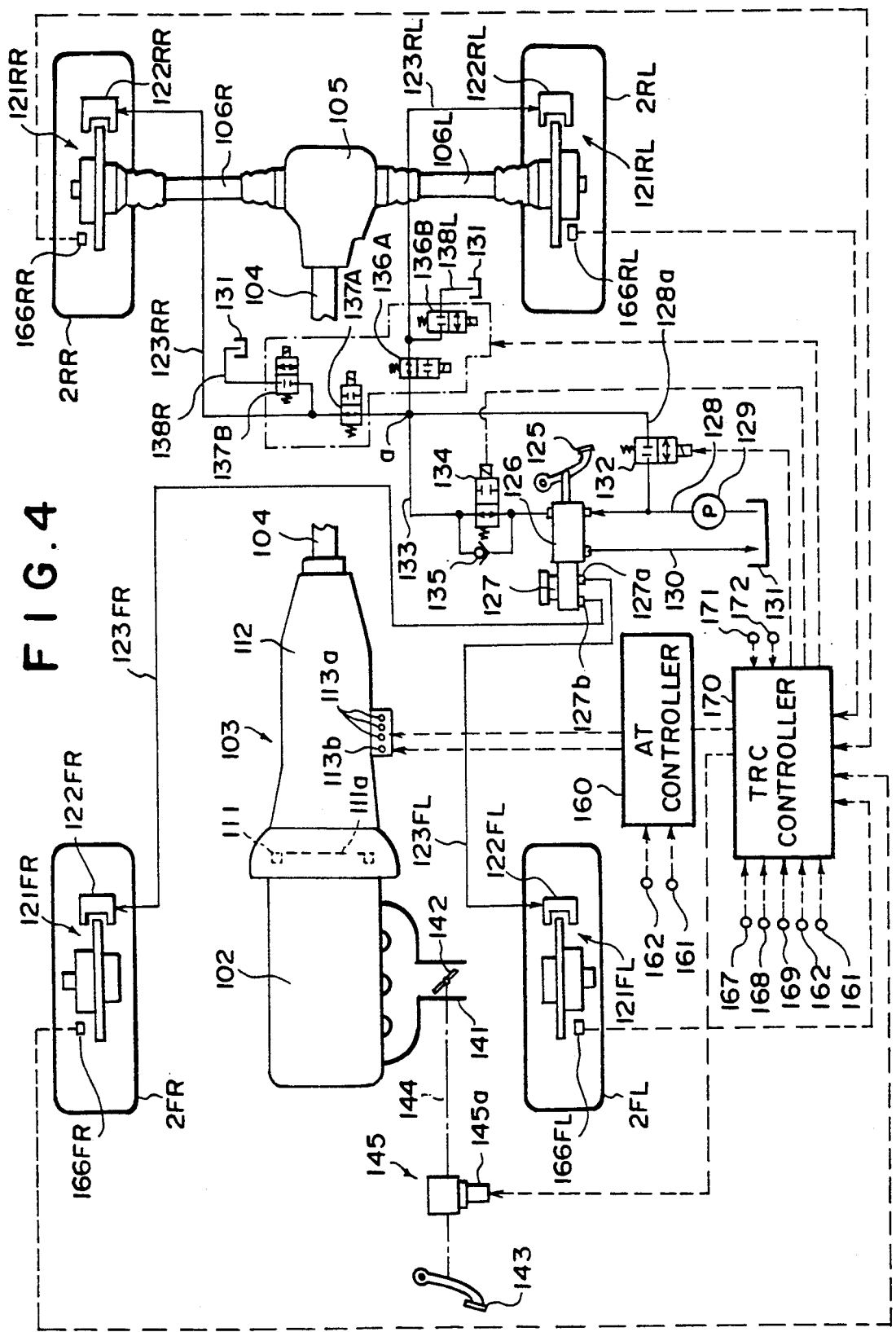
FIG. 4 is a schematic view showing a traction control system.

FIG. 4 schematically shows a vehicle provided with a TRC system. In this particular example, left and right front wheels 2FL and 2FR are driven wheels and left and right rear wheels 2RL and 2RR are driving wheels. An engine 102 is mounted at the front of the vehicle body, and the output torque of the engine 102 is transmitted to the left rear wheel 2RL through an automatic transmission 103, a propeller shaft 104, a differential gear 105 and a left driving axle 106L, and to the right rear wheel 2RR through the automatic transmission 103, the propeller shaft 104, the differential gear 105 and a right driving axle 106R.

The automatic transmission 103 comprises a torque converter 111 and a transmission gear mechanism 112. The transmission gear mechanism 112 is hydraulically operated and has four forward speeds and one reverse speed in this particular example. The automatic transmission 103 is shifted by selectively energizing and de-energizing a plurality of solenoids 113a in the hydraulic circuit. The torque converter 111 has a lockup clutch 111a which is applied or released by energizing or de-energizing a solenoid 113b in the hydraulic circuit.

The solenoids 113a and 113b are controlled by an AT (automatic transmission) controller 160. A throttle opening signal from a throttle opening sensor 161 which detects the opening of the throttle valve and a vehicle speed signal from a vehicle speed sensor 162 which detects the vehicle speed (represented by the rotational speed of the propeller shaft 104 in this embodiment) are input into the AT controller 160.

The wheels 2FL, 2FR, 2RL and 2RR are respectively provided with brakes 121FL, 121FR, 121RL and 121RR. Brake fluid pressure is applied to calipers (wheel cylinder) 122FL, 122FR, 122RL and 122RR for the brakes by way of brakes pipes 123FL, 123FR, 123RL and 123RR. The brake lines are as follows.

Brake pedal (125) depressing force is multiplied by a liquid-pressure-operated booster 126 and then transmitted to a tandem master cylinder 127. The brake pipe 123FL for the left front wheel is connected to a first discharge port 127a of the master cylinder 127, and the brake pipe 123FR for the right front wheel is connected to a second discharge port 127b. Liquid pressure is fed to the booster 126 from a pump 129 through a pipe 128, and excess liquid pressure is returned to a reservoir 131 through a return pipe 130. A branch pipe 128a which branches off from the pipe 128 communicates with a junction which will be described later, and is provided with a solenoid on-off valve 132. Boosting pressure produced in the booster 126 is fed to said junction through a pipe 133 which is also provided with a solenoid on-off valve 134. A check valve 135 which permits brake fluid to flow only toward the junction is connected to the pipe 133 in parallel to the on-off valve 134.

The brake pipes 123RL and 123RR for the left and right rear wheels are connected to the junction a. The brake pipes 123RL and 123RR are respectively provided with solenoid on-off valves 136A and 137A. A relief passage 138L is connected to the brake pipes 123RL downstream of the on-off valve 136A and a solenoid on-off valve 136B is provided in the relief passage 138L. Similarly, a relief passage 138R is connected to the brake pipes 123RR downstream of the on-off valve 137A and a solenoid on-off valve 137B is provided in the relief passage 138R.

The on-off valves 132, 134, 136A, 137A, 136B and 137B are controlled by a TRC controller 170 for traction control. When the traction control is not effected, the on-off valve 132 is closed, the on-off valve 134 is opened, the on-off valves 136B and 137B are closed and the on-off valves 136A and 137A are opened as shown in FIG. 4. When the brake pedal 125 is pushed down in this state, brake fluid pressure is applied to the brakes 121FL and 121FR for the front wheels through the master cylinder 127 and boosting pressure is applied to the brakes 121RL and 121RR for the rear wheels as the brake fluid pressure by the booster 126 according the brake pedal depressing force.

When the slip of the driving wheels (rear wheels 2RL and 2RR) relative to road surface becomes large and the traction control is effected as will be described later, the on-off valve 134 is closed and the on-off valve 132 is opened. Then by duty control of the on-off valves 136A and 136B (137A and 137B), the brake fluid pressure is held constant, increased or lowered. More particularly, with the on-off valve 132 kept open, the brake fluid pressure is held constant when the on-off valves 136A, 136B, 137A and 137B are closed, is increased when the on-off valve 136A (137A) is opened and the on-off valve 136B (137B) is opened, and is lowered when the on-off valve 136A (137A) is closed and the on-off valve 136B (137B}is opened. The brake fluid pressure which has been transmitted through the branch passage 128a does not act on the brake pedal 125 as counterforce by virtue of the check valve 135.

When the brake pedal 125 is pushed down while such traction control is being effected, brake fluid pressure the value of which depends upon the amount of depression of the brake pedal 125 is applied to the brakes 121RL and 121RR for the rear wheels from the booster 126 through the check valve 135.

The TRC controller 170 brakes the rear wheels 2RL and 2RR in order to reduce the driving torque thereof and at the same time reduces the output torque of the engine 102. For this purpose, a throttle opening controlling mechanism 145 is inserted into an interlocking mechanism 144 which interlocks a throttle valve 142 disposed in an intake passage 141 of the engine 102 with an accelerator pedal 143. The throttle opening controlling mechanism 145 is driven by an electric motor 145a, and while the motor 145a is off, the opening of the throttle valve 142 is solely depend on the amount of depression of the accelerator pedal 143 (i.e., the throttle opening changes from 0% to 100% as the amount of depression of the accelerator pedal changes from 0% to 100%). While the motor 145a is on, the throttle opening is caused to be 0 when the amount of depression of the accelerator pedal 143 is not larger than a predetermined value, and is increased from 0 with increase in the amount of depression of the accelerator pedal 143 when the amount of depression of the accelerator pedal 143 is larger than the predetermined value.

During the traction control, the TRC controller 170 controls the brakes, the engine output (by controlling the motor 145a which drives the throttle opening controlling mechanism 145) and the lockup of the automatic transmission 103 (by way of the AT controller 160). In addition to the signals from the throttle opening sensor 161 and the vehicle speed sensor 162, wheel speed signals from wheel speed sensors 166FL, 166FR, 166RL and 166RR which detect the rotational speeds of the wheels 2FL, 2FR, 2RL and 2RR, an accelerator depression signal from an accelerator depression sensor 167 which detects the amount of depression of the accelerator pedal 143, a motor operation signal from a motor operation sensor 168 which detects the state of operation of the motor 145a (i.e., the throttle opening depending on the operation of the motor 145a), a steering angle signal from a steering angle sensor 169 which detects the turning angle of the steering wheel, a mode signal from a switch 171 which is manually operated, and a brake signal from a brake switch 172 which is turned on when the brake pedal 125 is pushed down.

Figure 5:
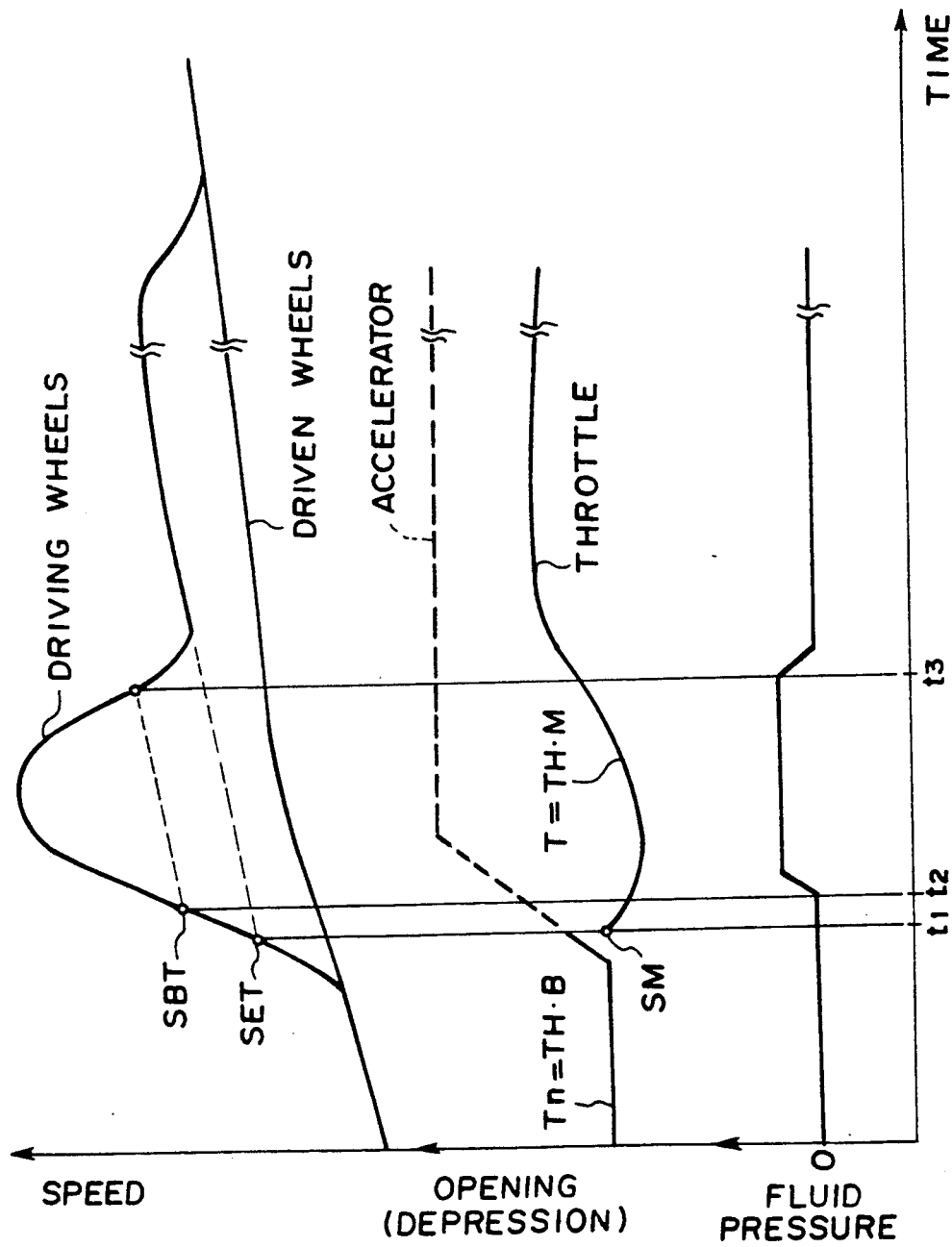
FIG. 5 is a time chart for illustrating the operation of the TRC controller which is executed on the engine and the brake during the traction control.

FIG. 5 shows the operation of the TRC controller 170 which is executed on the engine and the brake during the traction control. In FIG. 5 a target value (a target slip value of the driving wheels) with respect to the engine is denoted by SET and a target value with respect to the brake is denoted by SBT. (SBT>SET)

Until time t1, a target throttle opening Tn is set to a basic throttle opening TH.B corresponding to the actual amount of depression of the accelerator pedal since slip of the driving wheels is not so large.

At the time t1, slip of the driving wheels increases to the target value SET with respect to the engine (will be referred to as "the engine target value SET", hereinbelow). In this embodiment, the traction control is commenced when slip of the driving wheels exceeds the engine target value SET, and at the time t1, the throttle opening is directly reduced to a lower limit control value SM (feed-forward control). After the throttle opening is once reduced to the lower limit control value SM, the throttle opening is feedback-controlled so that slip of the driving wheels converges on the engine target value SET. At this time, the target throttle opening Tn is set to TH·M (manipulating variable of the motor 145a). (TH·M≦TH·B)

At time t2, slip of the driving wheels increases to the target value SBT with respect to the brake (will be referred to as "the brake target value SBT", hereinbelow). At the time t2, brake fluid pressure is applied to the brakes 121RL and 121RR for the driving wheels, that is, traction controls by the engine control and the brake control is commenced. The brake fluid pressure is feedback-controlled so that slip of the driving wheels converges on the brake target value SBT.

At time t3, slip of the driving wheels falls below the brake target value SBT, and after the time t3, the brake fluid pressure is gradually reduced to zero. The slip control by control of the engine is still continued.

In this embodiment, the traction control is ended when the amount of depression of the accelerator pedal becomes zero.

Figure 6:
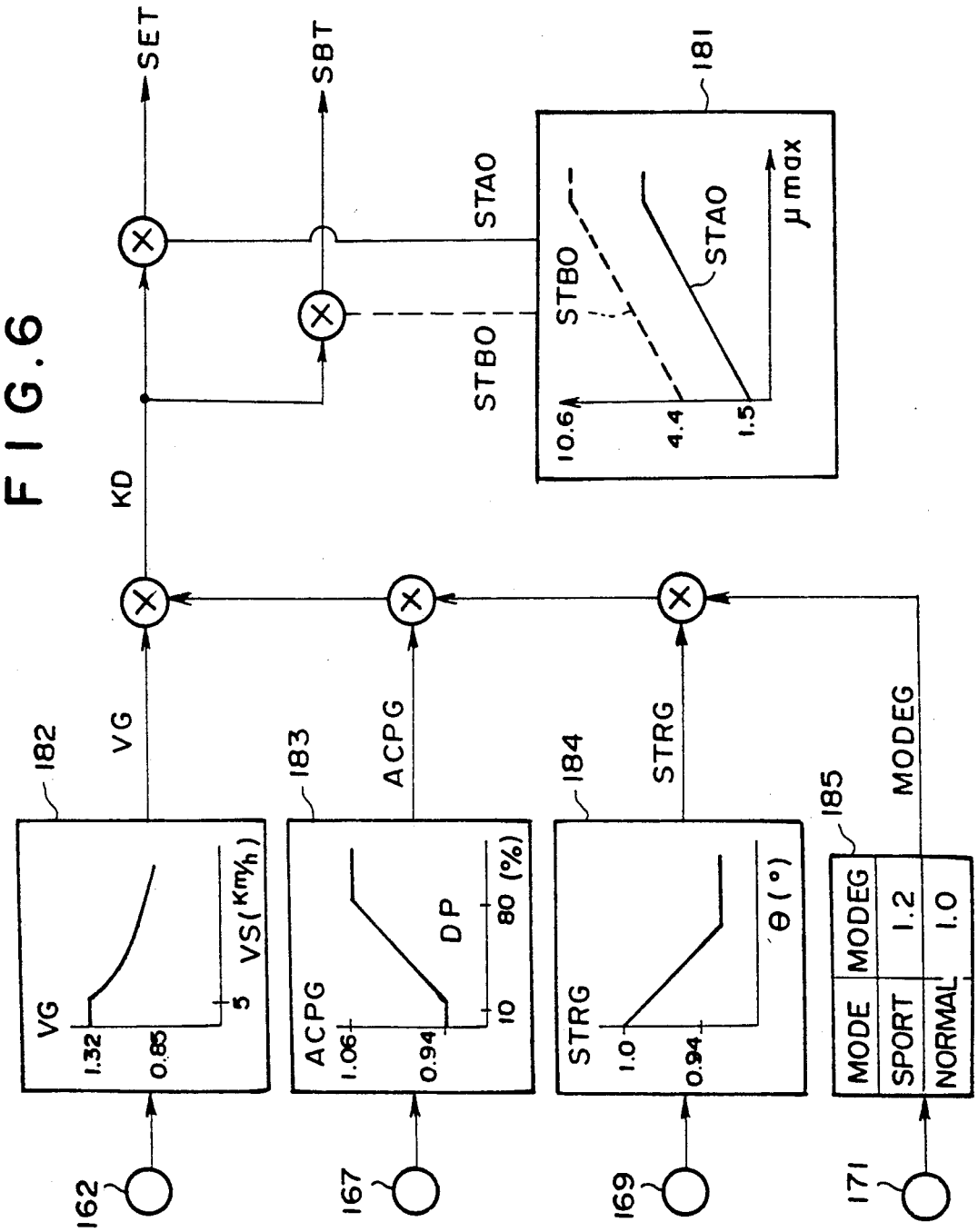
FIG. 6 shows a circuit for determining the target slip values with respect to the engine control and the brake control.

FIG. 6 is block diagram for illustrating a circuit for determining the engine target value SET and the brake target value SBT. These values are determined according to the vehicle speed VS, the amount of depression of the accelerator pedal DP, the steering angle $\theta$, the position of the mode switch 171 and the maximum friction coefficient $\mu$max of road surface.

In FIG. 6, basic values STAO and STBO of the engine target value SET and the brake target value SBT are stored in a map 181 as functions of the maximum friction coefficient $\mu$max of road surface. (STBO>STAO) The engine target value SET and the brake target value SBT are obtained by multiplying the basic values STAO and STBO read out from the map 181 by correction gain coefficient KD.

The correction gain coefficient KD is obtained by multiplying gain coefficients VG, ACPG, STRG and MODEG together. The gain coefficient VG is stored in a map 182 as a function of the vehicle speed VS. The gain coefficient ACPG is stored in a map 183 as a function of the amount of depression of the accelerator pedal DP. The gain coefficient STRG is stored in a map 184 as a function of the steering angle $\theta$. The gain coefficient MODEG is manually selected by the driver and is stored in table 185. In the table 185, sport mode and normal mode are set.

Figure 7:
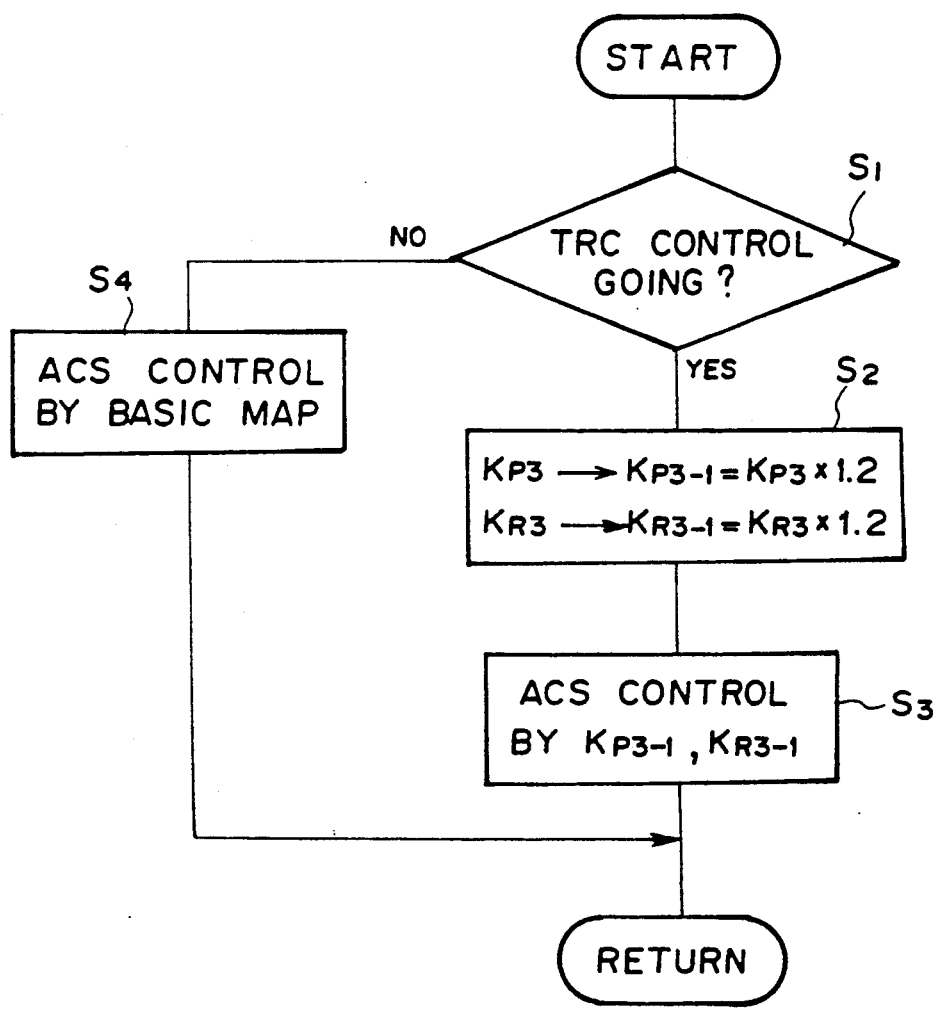
FIG. 7 is a flow chart for illustrating the active suspension control on the basis of the TRC signal.

In accordance with the present invention, as shown in FIG. 1, the working signal (TRC signal) output from the TRC controller 170 is input into the ACS controller 19 and the ACS controller 19 controls the properties of the active suspension (active suspension control) on the basis of the TRC signal. The active suspension control on the basis of the TRC signal is effected according to the flow chart shown in FIG. 7.

In step S1, the ACS controller 19 determines on the basis of the TRC signal whether the traction control is going on. When it is determined in step S1 that the traction control is not going on, the ACS controller 19 controls the active suspension on the basis of the control gains shown in the basic map (the aforesaid table) and then returns. On the other hand, when it is determined in step S1 that the traction control is going on, the ACS controller 19 multiplies the control gains KP3, PR3 (KRF3, KRR3) of the control system C shown in the basic map by 1.2 and obtains increased control gains KP3-1 and KR3-1. (step S2) Then in step S3, the ACS controller 19 controls the active suspension on the basis of the increased control gains KP3-1 and KR3-1. Thus, the control gain of the ACS control system is increased while the traction control is going on.

Thus in the active suspension control, the control gains KP3 and KR3 of the control system C are made larger than the normal when the traction control is going on. Accordingly, sinkage of the rear part of the vehicle (so-called squat) which occurs in response to commencement of the traction control can be effectively suppressed by quickly extending the fluid cylinders 3 for the rear wheels by the active suspension control on the basis of the increased control gains, thereby improving the running stability. The reason the control gains KP3 and LR3 of the control system C which relate to the vertical vibration of the vehicle body are increased is increase of the control gains affects the driving comfort least.

Figure 8:
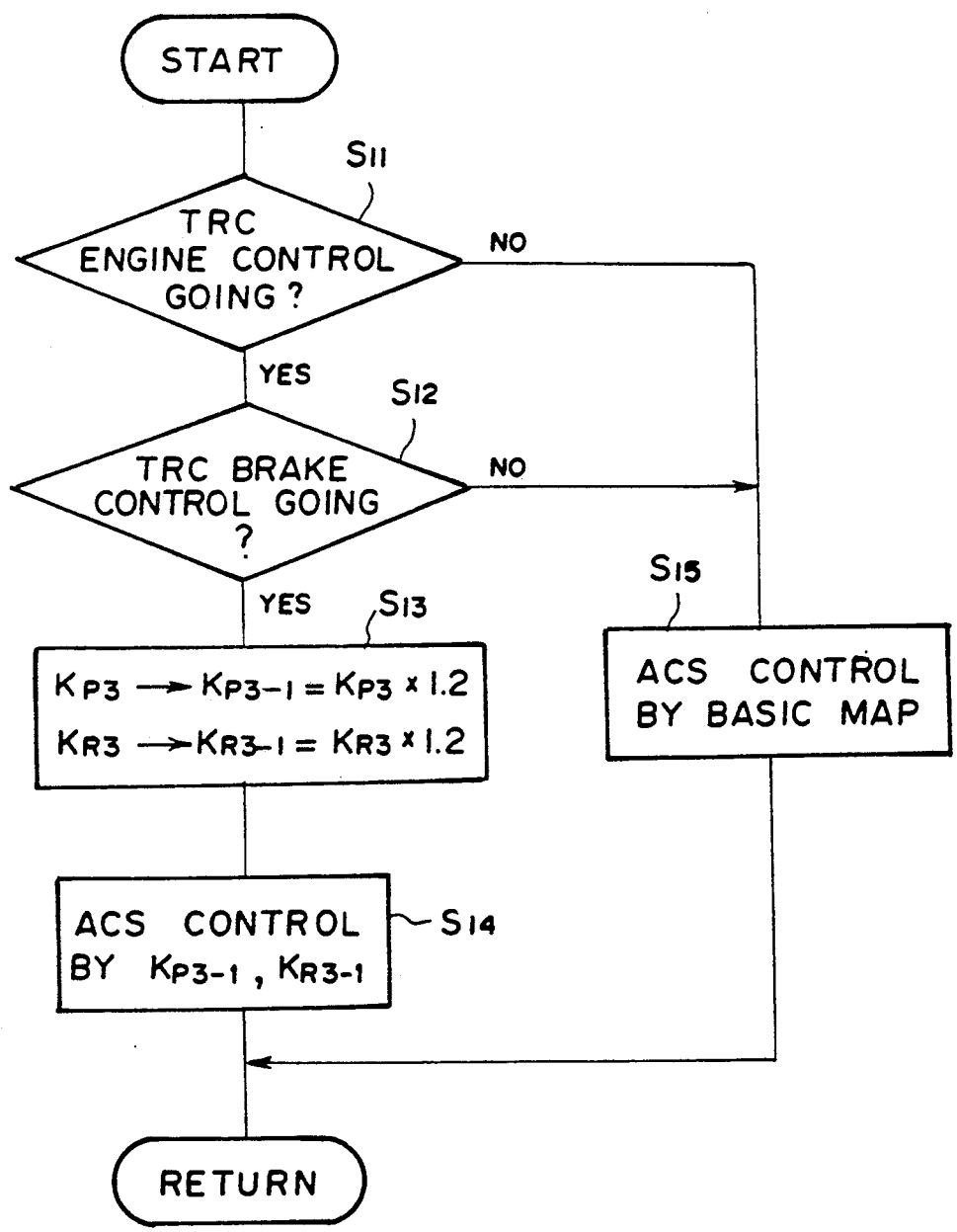
FIGS. 8 to 10 show modifications of the active suspension control on the basis of the TRC signal.
Figure 9:
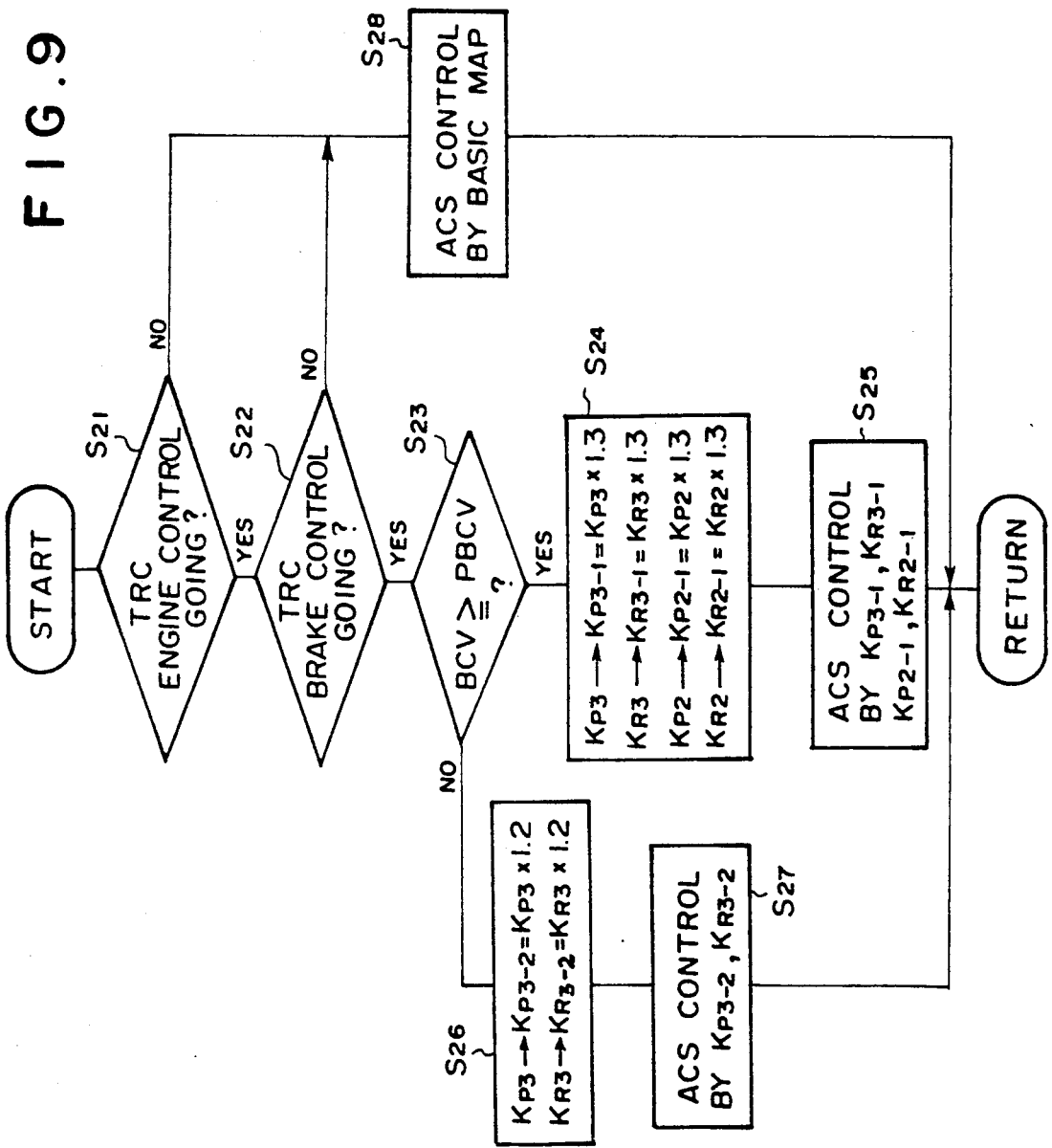
Figure 10:
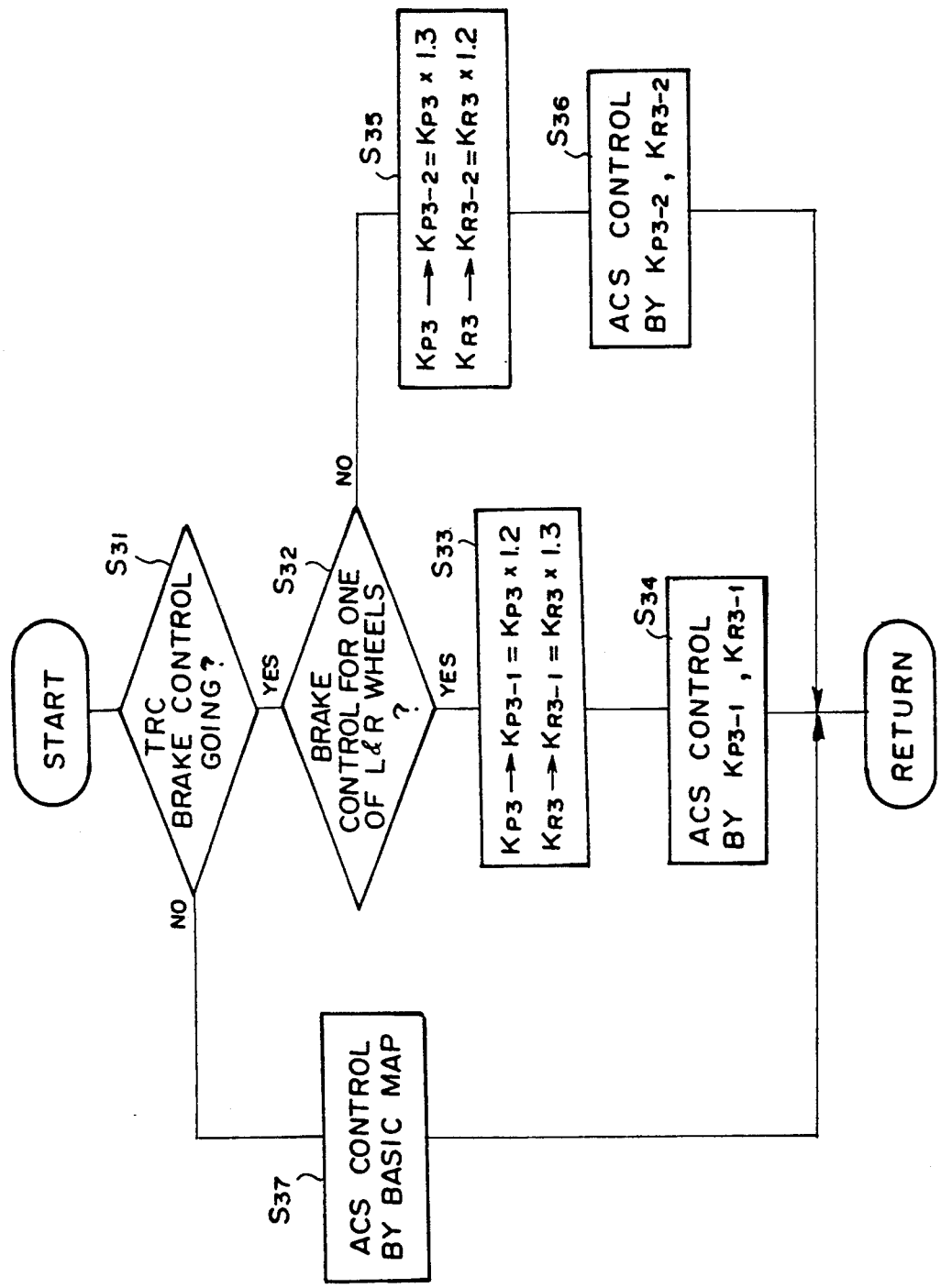

FIGS. 8 to 10 show modifications of the active suspension control on the basis of the TRC signal. In the case of the modification shown in FIG. 8, only when both the engine control and the brake control are being effected for the traction control, the control gains KP3 and KR3 of the control system C are increased (step S13) and the active suspension is controlled on the basis of the increased control gains KP3-1 and KR3-1. (step S14)

In the case of the modification shown in FIG. 9, when both the engine control and the brake control are being effected for the traction control, the control gains are increased according to the brake control variable BCV. That is, when the brake control variable BCV is not smaller than a predetermined value PBCV, the control gains KP3 and KR3 of the control system C and the control gains KP2 and KR2 of the control system B are multiplied by 1.3, and the active suspension is controlled on the basis of the increased control gains KP3-1, KR3-1, KP2-1 and KR2-1. (steps S24 and S25) On the other hand, when the brake control variable BCV is smaller than the predetermined value PBCV, only the control gains LP3 and KR3 of the control system C are multiplied by 1.2 and the active suspension is controlled on the basis of the increased control gains KP3-2 and KR3-2. (steps S26 and S27)

In the case of the modification shown in FIG. 10, the control gains KP3 and KR3 of the control system C are increased to different values when the brake control is effected for one of the left and right wheels and when the brake control is effected for both the left and right wheels. (steps S33 and S35)

What is claimed is:

1. A suspension-traction total control system for a vehicle comprising a traction control system which reduces driving torque for driving wheels of the vehicle when the driving wheels slip, with said traction control system controlling at least one of the engine and brakes for the wheels of the vehicle in order to reduce the driving torque, an active suspension system which has a cylinder disposed between the vehicle body and each of the wheels of the vehicle and in which suspension properties can be changed, a control means for controlling feed and discharge of the hydraulic fluid to and from the cylinders, and a control gain changing means which increases a control gain of the active suspension system when the traction control system is operating so that a flow rate of the hydraulic fluid is altered, wherein said control means includes a control system which suppresses the vehicle level displacement speed on the basis of vehicle level displacement speed signals which are obtained by differentiating outputs of vehicle level sensors provided for the respective wheels, the control gain of the control system being increased when the traction control system is controlling both the engine and the brakes and the value of a brake control variable is not smaller than a predetermined value.

2. A suspension-traction total control system as defined in claim 1 in which said active suspension system includes a second control system which suppresses vertical vibrations of the vehicle body on the basis of detecting signals of vertical acceleration sensors which detect the vertical accelerations of the vehicle body on the wheels, and the control gain of the second control system is increased when said traction control system is operating.

3. A suspension-traction total control system as defined in claim 2 in which said traction control system controls at least one of the engine and brakes for the wheels of the vehicle in order to reduce the driving, torque, and the control gain of the second control system is increased when the traction control system is controlling both the engine and the brakes.

4. A suspension-traction total control system as defined in claim 3 in which only the control gain of the second control system is increased when the traction control system is controlling both the engine and the brakes and the value of the brake control variable is smaller than the predetermined value.

5. A suspension-traction total control system as defined in claim 4 in which the control gain of the second control system is increased by a smaller value when the traction control system is controlling both the engine and the brakes and the value of the brake control variable is smaller than the predetermined value than when the traction control system is controlling both the engine and the brakes and the value of the brake control variable is not smaller than the predetermined value.

6. A suspension-traction total control system as defined in claim 3 in which the control gain of the second control system is increased to different values when the traction control system is controlling the brakes for one of the left and right wheels and when the traction control system is controlling the brakes for both the left and right wheels.

7. A suspension-traction total control system for a vehicle comprising a traction control system which reduces driving torque for driving wheels of the vehicle when the driving wheels slip, with said traction control system controlling at least one of the engine and brakes for the wheels of the vehicle in order to reduce the driving torque, an active suspension system which has a cylinder disposed between the vehicle body and each of the wheels of the vehicle and in which suspension properties can be changed by controlling feed and discharge of the hydraulic fluid to and from the cylinders, and a control gain changing means which increases a control gain of the active suspension system when the traction control system is operating, wherein said active suspension system includes a first control system which suppresses vertical vibrations of the vehicle body on the basis of detecting signals of vertical accelerations of the vehicle body of the wheels, and a second control system which suppresses the vehicle level displacement speed on the basis of vehicle level displacement speed signals which are obtained by differentiating outputs of vehicle level sensors provided for the respective wheels, both the control gains of the first and second control systems being increased when the traction control system is controlling both the engine and the brakes and the value of a brake control variable is not smaller than a predetermined value.

8. A suspension-traction total control system for a vehicle comprising a traction control system which reduces driving torque for driving wheels of the vehicle when the driving wheels slip, with said traction control system controlling at least one of the engine and brakes for the wheels of the vehicle in order to reduce the driving torque, an active suspension system which has a cylinder disposed between the vehicle body and each of the wheels of the vehicle and in which suspension properties can be changed by controlling feed and discharge of the hydraulic fluid to and from the cylinders, and a control gain changing means which increases a control gain of the active suspension system when the traction control system is operating, wherein said active suspension system includes a first control system which suppresses vertical vibrations of the vehicle body on the basis of detecting signals of vertical accelerations of the vehicle body on the wheels, the control gain of the first control system is increased to different values when the traction control system is controlling the brakes for one of the left and right wheels and when the traction control system is controlling the brakes for both the left and right wheels.

* * * * *